United States Patent
Aso et al.

[11] Patent Number: 5,595,675
[45] Date of Patent: Jan. 21, 1997

[54] FIBER TREATMENT COMPOSITIONS

[75] Inventors: Takayuki Aso; Isao Ona; Masaru Ozaki, all of Chiba Prefecture, Japan

[73] Assignee: Dow Corning Toray Silicone Co., Ltd., Tokyo, Japan

[21] Appl. No.: 521,201

[22] Filed: Aug. 30, 1995

[30] Foreign Application Priority Data

Aug. 31, 1994 [JP] Japan .................. 6-230787

[51] Int. Cl.$^6$ ............... D06M 13/513; D06M 13/517
[52] U.S. Cl. ............... 252/8.61; 106/287.13; 106/287.14; 106/287.15; 106/287.16; 8/115.6; 427/387; 428/391
[58] Field of Search .............. 252/8.6; 106/287.13, 106/287.14, 287.15, 287.16; 427/387; 428/391; 8/115.6

[56] References Cited

U.S. PATENT DOCUMENTS

| | | | |
|---|---|---|---|
| 4,087,478 | 5/1978 | Keil | 525/477 |
| 5,135,575 | 8/1992 | Yang et al. | 106/287.16 |
| 5,338,352 | 8/1994 | Breneman et al. | 106/287.16 |

FOREIGN PATENT DOCUMENTS

| | | | |
|---|---|---|---|
| 601300 | 7/1960 | Canada | 106/287.16 |
| 50-78695 | 1/1975 | Japan. | |

*Primary Examiner*—Anthony Green
*Attorney, Agent, or Firm*—Timothy J. Troy

[57] ABSTRACT

The present invention relates to a fiber treatment composition comprising (A) 100 weight parts of a dimethylpolysiloxane having a viscosity at 25° C. of 2 to 100 mm$^2$/s, (B) 1 to 20 weight parts of a metal salt of a fatty acid having from 10 to 20 carbon atoms, and (C) 0.05 to 10 weight parts of at least one organopolysiloxane resin comprising $SiO_{4/2}$ units and $R_3SiO_{1/2}$ units wherein R denotes a monovalent hydrocarbon group. The fiber treatment compositions of this invention have excellent dispersion stability and impart superior smoothness and antistick characteristics to fibers and is especially useful in treating spandex fibers.

18 Claims, No Drawings

FIBER TREATMENT COMPOSITIONS

BACKGROUND OF THE INVENTION

This invention relates to a composition for use on fibers. More particularly, this invention relates to a fiber treatment composition that produces fibers having excellent smoothness and antistick performance and to a composition which exhibits excellent dispersion stability.

Because of their excellent heat resistance and lubricity, dimethylpolysiloxane oils have become widely used as neat fiber treatment agents (the term "neat" denotes a treatment agent that contains 100% fiber treatment agent and does not contain solvent or water) for mechanical sewing thread and highly elastic polyurethane fibers (i.e. spandex). For example, in Japanese Patent Application Laid-Open No. 50-78695 (78,695/1975) it is disclosed that the smoothness and antistick character of fibers can be improved through the combined used of a dimethylpolysiloxane oil and the metal salt of a higher fatty acid.

However, because dimethylpolysiloxane oils and higher fatty acid metal salts are completely incompatible, the dispersibility of the higher fatty acid metal salts in the above types of compositions is very poor, and sedimentation occurs immediately when this type of composition is allowed to stand. The addition of a suspension agent to these types of compositions has been a method for improving the dispersibility, but the use of a suspension agent is also problematic because it reduces the lubricity of the treated fiber.

Pretreatment of the higher fatty acid metal salt with an organic solvent, such as a low-molecular-weight alcohol, has been disclosed for the purpose of improving the dispersion stability, for example in Japanese Patent Application Opening No. Hei 3-500183 (500,183/1991) WO90/00581, but this method is compromised by its use of an organic solvent, which raises the risk of air and water pollution, ignition or detonation, and human toxicity.

Japanese Patent Application Publication No. Sho 63-12197 (12,197/1988) discloses a fiber treatment composition that contains an organopolysiloxane resin. The neat lubricant is a composition comprising dimethylpolysiloxane oil, a particular organopolysiloxane resin, and a higher fatty acid such as stearic acid. However, because this composition contains a higher fatty acid, the corresponding smoothness is quite susceptible to variation in response to changes in temperature and sticking between the treated fibers also tends to occur quite readily.

SUMMARY OF THE INVENTION

The present invention relates to a fiber treatment composition comprising a dimethylpolysiloxane, a metal salt of a higher fatty acid, and at least one organopolysiloxane resin.

It is an object of the present invention to produce a fiber treatment composition which provides excellent smoothness and antistick performance to fibers and exhibits excellent dispersion stability.

It is a further object of the present invention to produce a composition which is especially useful as a neat lubricant for highly elastic polyurethane fibers (spandex).

DETAILED DESCRIPTION OF THE INVENTION

The present invention relates to a fiber treatment composition comprising (A) 100 weight parts of a dimethylpolysiloxane having a viscosity at 25° C. of 2 to 100 mm$^2$/s, (B) 1 to 20 weight parts of a metal salt of a fatty acid having from 10 to 20 carbon atoms, and (C) 0.05 to 10 weight parts of at least one organopolysiloxane resin comprising $SiO_{4/2}$ units and $R_3SiO_{1/2}$ units wherein R denotes a monovalent hydrocarbon group with the proviso that said resin is free of $RSiO_{3/2}$ units wherein R is as defined above.

The dimethylpolysiloxane of (A) functions to impart lubricity to the fiber. This component has a viscosity at 25° C. of 2 to 100 mm$^2$/s (1 mm$^2$/s=1 centistoke (cS)). The lubricity is inadequate at viscosities below 2 mm$^2$/s, while fiber absorption of the dimethylpolysiloxane becomes too large at viscosities in excess of 100 mm$^2$/s. The dimethylpolysiloxane may have a straight-chain or cyclic molecular structure. The straight-chain versions of (A) may be partially branched and are preferably endblocked by trimethylsiloxy or dimethylhydroxy groups.

Component (B) is a metal salt of a fatty acid having from 10 to 20 carbon atoms, and this component functions to inhibit adhesion or sticking between the fibers. This component is exemplified by magnesium stearate, zinc stearate, calcium stearate, and barium stearate. This component should be added at 1 to 20 weight parts per 100 weight parts of component (A) and preferably at 4 to 8 weight parts per 100 weight parts of component (A). The antistick performance is inadequate at below 1 weight part and the composition according to the present invention exhibits poor fluidity at more than 20 weight parts which can negatively affect the lubricity of the treated fiber.

The organopolysiloxane resin of component (C) is compatible with component (A). The organopolysiloxane resin comprises siloxane units having the formula $SiO_{4/2}$ and siloxane units of the formula $R_3SiO_{1/2}$ and must be free of siloxane units having the formula $RSiO_{3/2}$. The R groups above denote monovalent hydrocarbon groups and are specifically exemplified by alkyl groups such as methyl, ethyl, propyl, tert-butyl, 2-ethylhexyl, dodecyl, and octadecyl, alkenyl groups such as vinyl, allyl, and hexadienyl, aryl groups such as phenyl, or naphthyl, haloalkyl groups such as chloromethyl, 3,3,3-trifluoropropyl, 3,3,4,4,5,5,5-heptafluoropentyl, and difluoromonochloropropyl. It is preferred that R is selected from alkyl, alkenyl, or haloalkyl groups and methyl is particularly preferred.

The $SiO_{4/2}$ siloxane unit to $R_3SiO_{1/2}$ siloxane unit molar ratio of (C) is preferably in the range from 1:0.6 to 1:0.9. The organopolysiloxane resin (C) may be prepared by (a) treating water glass with trialkylchlorosilane; (b) hydrolyzing one or a mixture of two or more chlorosilanes selected so as to have 0.1 to 2.4 monovalent hydrocarbon groups per silicon atom; and (c) the acid- or base- catalyzed condensation of one or a mixture of two or more organoalkoxysilanes selected so as to have 0.1 to 2.4 monovalent hydrocarbon groups per silicon atom.

The organopolysiloxane resin (C) may further comprise SiOR' groups where R' is selected from hydrogen, a monovalent hydrocarbon group, or methoxyethyl. The monovalent hydrocarbon groups of R' are exemplified by methyl, ethyl, propyl, tert-butyl, dodecyl, 1-isobutyl-3,5-dimethylhexyl, or octadecyl. It is preferred that R' be methyl.

Component (C) can be an organopolysiloxane resin as described above or an organopolysiloxane resin yielded by heating the organopolysiloxane resin as described above in order to effect partial silanol group condensation. Component (C) may comprise a single organopolysiloxane resin or a combination of 2 or more organopolysiloxane resins.

This component should be added in a range from 0.05 to 10 weight parts per 100 weight parts of component (A) and is preferably added in a range from 0.2 to 6 weight parts per 100 weight parts of component (A). At less than 0.05 weight parts the dispersion stability is unsatisfactory and at more than 10 weight parts the properties of the treated fiber and the properties of the lubricant itself may be negatively affected.

The composition of the present invention comprises the components (A), (B), and (C) described above, but other components may be added insofar as the object of the present invention is not impaired. These additives are exemplified by rust preventives, antistatics, and organopolysiloxanes other than components (A) and (C).

The composition according to the present invention can be prepared by the simple mixing of components (A), (B), and (C), but is preferably prepared by preliminarily mixing components (B) and (C) and thereafter adding component (A).

Substrates, especially fibers, may be treated with the composition according to the present invention by, for example, (i) dipping the fiber in a treatment bath prepared from the composition according to this invention followed by roll expression or (ii) contacting a run of the fiber with a pick-up roll. While composition add-on will vary with the type of fiber, an add-on in the range from 0.05 to 7.0 weight % calculated as an organopolysiloxane fraction referred to fiber is generally preferred. An add-on in the range from 0.5 to 5.0 weight % is particularly preferred. Heat treatment is preferably effected after application in order to achieve uniform treatment of the substrate with the composition of the invention. Fibers that may be treated with the compositions of this invention are exemplified by natural fibers such as wool, silk, flax, cotton, angora, and mohair, regenerated fibers such as rayon and bemberg, semisynthetic fibers such as acetate, and synthetic fibers such as polyester, polyamide, polyacrylonitrile, polyvinyl chloride, vinylon, polyethylene, polypropylene, and polyurethane (spandex).

The present invention is explained in greater detail below through working examples, in which parts denotes weight parts, and % denotes weight % unless otherwise indicated. The viscosity is the value measured at 25° C. The prepared fiber treatment compositions were tested for sedimentation score and fiber/metal coefficient of kinetic friction using the following methods. The dispersion stability was evaluated based on the sedimentation score.

Sedimentation Score

About 100 ml of a prepared fiber treatment composition was introduced into and held in a 100 cc graduated cylinder. After a specified time had elapsed (1, 2, 3, or 30 days), the volume of the composition ($V_1$ in ml) and the interface between the supernatant and the produced white turbidity ($V_2$ in ml) were measured. These values were used to calculate the sedimentation score (4) from the following equation:

$$\text{sedimentation score } (\%) = (V_1 - V_2)/V_1 \times 100$$

Fiber/metal Coefficient of Kinetic Friction

100% cotton mechanical sewing thread was dipped in a 10 weight % toluene solution of the fiber treatment composition for 30 seconds. The machine thread was then removed, wrung out to an add-on of about 2.0 weight % fiber treatment composition, and dried. The machine thread thus treated was measured for its fiber/metal coefficient of kinetic friction using an instrument for measuring the coefficient of kinetic friction of fibers from Daiei Kagaku Seiki Seisakusho Kabushiki Kaisha.

EXAMPLE 1

The following were combined and mixed for 15 minutes: 6.0 parts of trimethylsiloxy-endblocked dimethylpolysiloxane having a viscosity of 10 mm$_2$/s, 6.0 parts of magnesium stearate, and 1.8 parts of a methylpolysiloxane resin comprising 45 mole % $(CH_3)_3SiO_{1/2}$ units and 55 mole % $SiO_{4/2}$ units (silanol groups were not present in the methylpolysiloxane resin). This was followed by the addition of 86.2 parts of a trimethylsiloxy-endblocked dimethylpolysiloxane having a viscosity of 10 mm$^2$/s and mixing for 15 minutes which resulted in a fiber treatment composition of this invention. The composition was then tested for measurement of its sedimentation score, viscosity, and fiber/metal coefficient of kinetic friction, and the results are reported in Table I. Table I also reports a general evaluation of its suitability for use as a neat fiber treatment composition.

EXAMPLE 2

The following were combined and mixed for 15 minutes: 6.0 parts of trimethylsiloxy-endblocked dimethylpolysiloxane having a viscosity of 10 mm$^2$/s, 6.0 parts of magnesium stearate, and 1.8 parts of a methylpolysiloxane resin comprising 45 mole % $(CH_3)_3SiO_{1/2}$ units and 55 mole % $SiO_{4/2}$ units and contained about 2.5 weight % silanol groups. This was followed by the addition of 86.2 parts of a trimethylsiloxy-endblocked dimethylpolysiloxane having a viscosity of 10 mm$^2$/s and mixing for 15 minutes which resulted in a fiber treatment composition of this invention. This composition was tested for measurement of its sedimentation score, viscosity, and fiber/metal coefficient of kinetic friction, and the results are reported in Table I. Table I also reports a general evaluation of its suitability for use as a neat fiber treatment composition.

COMPARATIVE EXAMPLE 1

A neat fiber treatment composition was prepared as in Example 1, but in this case a methylphenylsiloxane resin was used in place of the methylpolysiloxane resin that was used in Example 1. This methylphenylsiloxane resin comprised 85 mole % of a siloxane resin comprising $SiO_{4/2}$ units and $(CH_3)_3SiO_{1/2}$ units and 15 mole % of a siloxane resin comprising $CH_3SiO_{3/2}$ units and $C_6H_5SiO_{3/2}$ units. This composition was tested for measurement of its sedimentation score, viscosity, and fiber/metal coefficient of kinetic friction, and the results are reported in Table I. Table I also reports a general evaluation of its suitability for use as a neat fiber treatment composition.

COMPARATIVE EXAMPLE 2

A neat fiber treatment composition was prepared as in Example 1, but in this case using an organosiloxane resin comprising $C_5H_{11}SiO_{3/2}$ units in place of the methylpolysiloxane resin used in Example 1. This composition was tested for measurement of its sedimentation score, viscosity, and fiber/metal coefficient of kinetic friction, and the results are reported in Table I. Table I also reports a general evaluation of its suitability for use as a neat fiber treatment composition.

COMPARATIVE EXAMPLE 3

About 1.8 parts of isopropyl alcohol was first mixed for 15 minutes with 6.0 parts of magnesium stearate. This was followed by the addition of 92.2 parts of a trimethylsiloxy-endblocked dimethylpolysiloxane having a viscosity of 10 mm²/s and mixing for 15 minutes which resulted in a fiber treatment composition. This composition was tested for measurement of its sedimentation score, viscosity, and fiber/metal coefficient of kinetic friction, and the results are reported in Table I. Table I also reports a general evaluation of its suitability for use as a neat fiber treatment composition.

COMPARATIVE EXAMPLE 4

The following were combined and mixed for 15 minutes: 6.0 parts of a trimethylsiloxy-endblocked dimethylpolysiloxane having a viscosity of 10 mm²/s and 6.0 parts of magnesium stearate. This was followed by the addition of 88.0 parts of a trimethylsiloxy-endblocked dimethylpolysiloxane having a viscosity of 10 mm²/s and mixing for 15 minutes which resulted in a fiber treatment composition. This composition was tested for measurement of its sedimentation score, viscosity, and fiber/metal coefficient of kinetic friction, and the results are reported in Table I. Table I also reports a general evaluation of its suitability for use as a neat fiber treatment composition.

TABLE I

| | sedimentation score (%) | | | | Viscosity | fiber/metal coefficient | |
|---|---|---|---|---|---|---|---|
| | 1 day | 2 days | 3 day | 30 days | (mm²/s) | of kinetic friction | general evaluation |
| Ex. 1 | 0.8 | 1.0 | 1.1 | 7.7 | 21.1 | 0.120 | optimal: excellent dispersion stability |
| Ex. 2 | 0.6 | 0.9 | 1.1 | 8.0 | 21.3 | 0.106 | optimal: excellent dispersion stability |
| Comp. Ex. 1 | 1.0 | 1.5 | 1.8 | 15.9 | 21.9 | 0.112 | unsuitable: low dispersion stability |
| Comp. Ex. 2 | 1.5 | 2.5 | 3.3 | 22.8 | 21.1 | 0.120 | unsuitable: low dispersion stability |
| Comp. Ex. 3 | 0.6 | 1.1 | 1.5 | 15.2 | 20.3 | 0.114 | unsuitable: unsatisfactory dispersion stability |
| Comp. Ex. 4 | 1.5 | 2.6 | 3.4 | 23.3 | 19.3 | 0.111 | unsuitable: low dispersion stability |

EXAMPLE 3

The following were combined and mixed for 15 minutes: 6.0 parts of a trimethylsiloxy-endblocked dimethylpolysiloxane having a viscosity of 10 mm²/s, 6.0 parts of magnesium stearate, and 0.3 parts of a methylpolysiloxane resin comprising 45 mole % $(CH_3)_3SiO_{1/2}$ units and 55 mole % $SiO_{4/2}$ units (silanol groups were not present in this methylpolysiloxane resin). This was followed by the addition of 87.7 parts of a trimethylsiloxy-endblocked dimethylpolysiloxane having a viscosity of 10 mm²/s and mixing for 15 minutes which resulted in a fiber treatment composition of this invention. This composition was tested for measurement of its sedimentation score, viscosity, and fiber/metal coefficient of kinetic friction, and the results are reported in Table II. Table II also reports a general evaluation of its suitability for use as a neat fiber treatment composition.

EXAMPLE 4

The following were combined and mixed for 15 minutes: 6.0 parts of a trimethylsiloxy-endblocked dimethylpolysiloxane having a viscosity of 10 mm²/s, 6.0 parts of magnesium stearate, and 1.0 parts of a methylpolysiloxane resin comprising 45 mole % $(CH_3)_3SiO_{1/2}$ units and 55 mole % $SiO_{4/2}$ units (silanol groups were not present in this methylpolysiloxane resin). This was followed by the addition of 87.0 parts of a trimethylsiloxy-endblocked dimethylpolysiloxane having a viscosity of 10 mm²/s and mixing for 15 minutes which resulted in a fiber treatment composition of this invention. This composition was tested for measurement of its sedimentation score, viscosity, and fiber/metal coefficient of kinetic friction, and the results are reported in Table II. Table II also reports a general evaluation of its suitability for use as a neat fiber treatment composition.

EXAMPLE 5

The following were combined and mixed for 15 minutes: 6.0 parts of a trimethylsiloxy-endblocked dimethylpolysiloxane having a viscosity of 10 mm²/s, 6.0 parts of magnesium stearate, and 3.0 parts of a methylpolysiloxane resin comprising 45 mole % $(CH_3)_3SiO_{1/2}$ units and 55 mole % $SiO_{4/2}$ units (silanol groups were not present in this methylpolysiloxane resin). This was followed by the addition of 85.0 parts of a trimethylsiloxy-endblocked dimethylpolysiloxane having a viscosity of 10 mm²/s and mixing for 15 minutes which resulted in a fiber treatment composition of this invention. This composition was tested for measurement of its sedimentation score, viscosity, and fiber/metal coefficient of kinetic friction, and the results are reported in Table II. Table II also reports a general evaluation of its suitability for use as a neat fiber treatment composition.

COMPARATIVE EXAMPLE 5

The following were combined and mixed for 15 minutes: 6.0 parts of a trimethylsiloxy-endblocked dimethylpolysiloxane having a viscosity of 10 mm²/s, 6.0 parts of magnesium stearate, and 0.03 part of a methylpolysiloxane resin comprising 45 mole % $(CH_3)_3SiO_{1/2}$ units and 55 mole % $SiO_{4/2}$ units (silanol groups were not present in this methylpolysiloxane resin). This was followed by the addition of 87.97 parts of a trimethylsiloxy-endblocked dimethylpolysiloxane having a viscosity of 10 mm²/s and mixing for 15 minutes which resulted in a fiber treatment composition. This composition was tested for measurement of its sedimentation score, viscosity, and fiber/metal coefficient of kinetic friction, and the results are reported in Table II. Table II also reports a general evaluation of its suitability for use as a neat fiber treatment composition.

COMPARATIVE EXAMPLE 6

The following were combined and mixed for 15 minutes: 6.0 parts of a trimethylsiloxy-endblocked dimethylpolysiloxane having a viscosity of 10 mm²/s, 6.0 parts of magnesium stearate, and 10.0 parts of a methylpolysiloxane resin comprising 45 mole % $(CH_3)_3SiO_{1/2}$ and 55 mole % $SiO_{4/2}$ units (silanol groups were not present in this methylpolysiloxane resin). This was followed by the addition of 78.0 parts of a trimethylsiloxy-endblocked dimethylpolysiloxane having a viscosity of 10 mm²/s and mixing for 15 minutes which resulted in a fiber treatment composition. This composition was tested for measurement of its sedimentation score, viscosity, and fiber/metal coefficient of kinetic friction, and the results are reported in Table II. Table II also reports a general evaluation of its suitability for use as a neat fiber treatment composition.

TABLE II

| | sedimentation score (%) | | | | fiber/metal coefficient | |
|---|---|---|---|---|---|---|
| | 1 day | 2 days | 3 days | Viscosity (mm²/s) | of kinetic friction | general evaluation |
| Ex. 3 | 0.8 | 1.1 | 1.5 | 20.0 | 0.115 | optimal: excellent dispersion stability |
| Ex. 4 | 0.7 | 1.0 | 1.2 | 20.5 | 0.106 | optimal: excellent dispersion stability |
| Ex. 5 | 0.5 | 0.7 | 0.9 | 22.5 | 0.120 | optimal: excellent dispersion stability |
| Comp. Ex. 5 | 1.5 | 2.5 | 3.2 | 19.8 | 0.121 | unsuitable: low dispersion stability |
| Comp. Ex. 6 | 0.4 | 0.5 | 0.6 | 32.3 | 0.125 | unsuitable: high viscosity |

That which is claimed is:

1. A fiber treatment composition comprising:
   (A) 100 weight parts of a dimethylpolysiloxane having a viscosity at 25° C. of 2 to 100 mm²/s;
   (B) 1 to 20 weight parts of a metal salt of a fatty acid having from 10 to 20 carbon atoms; and
   (C) 0.05 to 10 weight parts of at least one organopolysiloxane resin comprising $SiO_{4/2}$ units and $R_3SiO_{1/2}$ units wherein R denotes a monovalent hydrocarbon group or a haloalkyl group with the proviso that said resin is free of $RSiO_{3/2}$ units wherein R is as defined above.

2. A composition according to claim 1, wherein (B) is selected from magnesium stearate, zinc stearate, calcium stearate, or barium stearate.

3. A composition according to claim 1, wherein the monovalent hydrocarbon group is selected from alkyl groups, alkenyl groups, or aryl groups.

4. A composition according to claim 3, wherein the alkyl group is selected from methyl, ethyl, propyl, tert-butyl, 2-ethylhexyl, dodecyl, or octadecyl.

5. A composition according to claim 1, wherein organopolysiloxane resin (C) further comprises SiOR' groups wherein R' is selected from hydrogen, a monovalent hydrocarbon group, or methoxyethyl.

6. A composition according to claim 5, wherein R' is selected from methyl, ethyl, propyl, tert-butyl, dodecyl, 1-isobutyl-3,5-dimethylhexyl, or octadecyl.

7. A composition according to claim 6, wherein R' is methyl.

8. A composition according to claim 3, wherein the alkenyl group is selected from vinyl, allyl, or hexadienyl.

9. A composition according to claim 1, wherein the haloalkyl group is selected from chloromethyl, 3,3,3-trifluoropropyl, 3,3,4,4,5,5,5-heptafluoropentyl, or difluoromonochloropropyl.

10. A composition according to claim 3, wherein the aryl group is selected from phenyl or naphthyl.

11. A method of treating a fiber, the method comprising the step of:
   (I) applying a mixture of:
      (A) 100 weight parts of a dimethylpolysiloxane having a viscosity at 25° C. of 2 to 100 mm²/s;
      (B) 1 to 20 weight parts of a metal salt of a fatty acid having from 10 to 20 carbon atoms; and
      (C) 0.05 to 10 weight parts of at least one organopolysiloxane resin comprising $SiO_{4/2}$ units and $R_3SiO_{1/2}$ units wherein R denotes a monovalent hydrocarbon group with the proviso that said resin is free of $RSiO_{3/2}$ units wherein R is as defined above to a fiber.

12. A method according to claim 11, wherein the method further comprises heating the fiber after step (I).

13. A method according to claim 11, wherein (B) is selected from magnesium stearate, zinc stearate, calcium stearate, or barium stearate.

14. A method according to claim 11, wherein the monovalent hydrocarbon group is selected from alkyl groups, alkenyl groups, or aryl groups.

15. A method according to claim 11, wherein the fiber is selected from wool, silk, flax, cotton, angora, mohair, rayon, bemberg, acetate, polyester, polyamide, polyacrylonitrile, polyvinyl chloride, vinylon, polyethylene, polypropylene, or spandex.

16. A method according to claim 12, wherein the fiber is selected from wool, silk, flax, cotton, angora, mohair, rayon, hemberg, acetate, polyester, polyamide, polyacrylonitrile, polyvinyl chloride, vinylon, polyethylene, polypropylene, or spandex.

17. A fiber produced in accordance with the method of claim 11.

18. A fiber produced in accordance with the method of claim 12.

* * * * *